No. 852,325. PATENTED APR. 30, 1907.
C. A. HALL.
PROCESS OF MAKING LEAD OXID.
APPLICATION FILED NOV. 17, 1905.
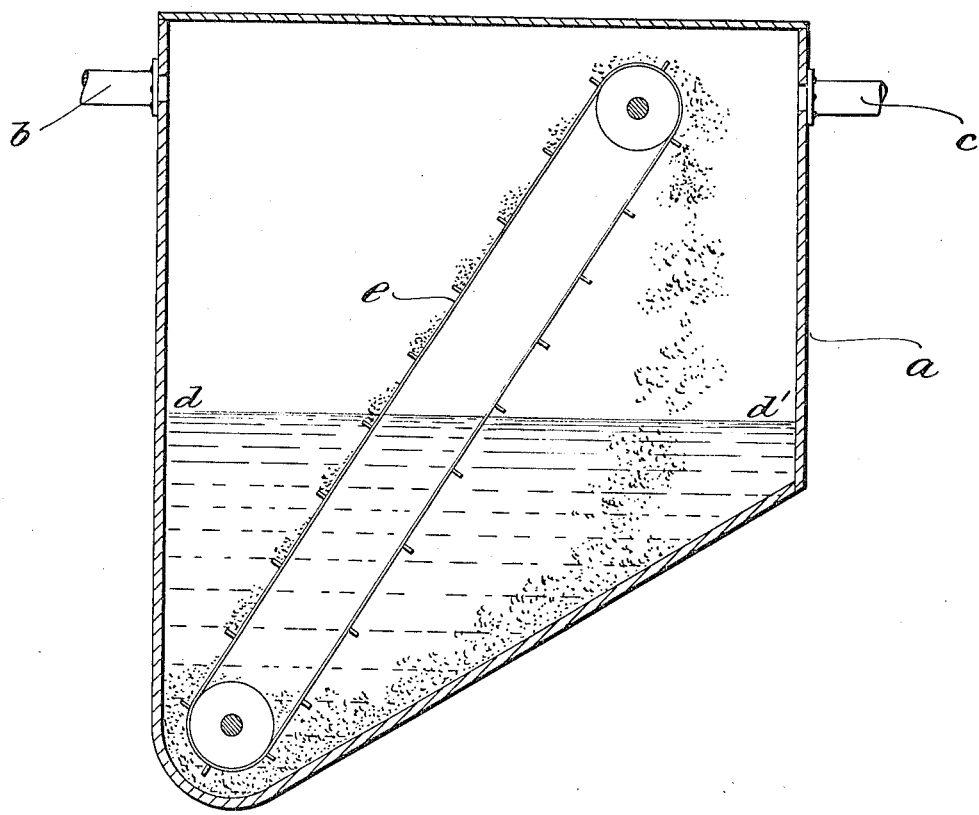

UNITED STATES PATENT OFFICE.

CLARENCE A. HALL, OF PHILADELPHIA, PENNSYLVANIA.

PROCESS OF MAKING LEAD OXID.

No. 852,325.      Specification of Letters Patent.      Patented April 30, 1907.

Application filed November 17, 1905. Serial No. 287,762.

*To all whom it may concern:*

Be it known that I, CLARENCE A. HALL, a citizen of the United States, residing at the city of Philadelphia, in the county of Philadelphia, and State of Pennsylvania, have invented a certain new and useful Process of Making Lead Oxid, of which the following is a specification.

The principal object of the present invention is to provide an efficient and reliable process for making or preparing lead oxid which may be of lighter specific gravity than that prepared by heat and which may be of a different structure which can be defined as amorphous as distinguished from the crystalline structure of ordinary lead oxid or litharge.

While the process may be practiced by means of a variety of apparatus, I have in the drawings illustrated partly in section one type of apparatus to which reference will be made.

Comminuted lead is used in the process and it can be obtained in the form of blown lead which is prepared according to well understood methods. The comminuted lead is wet with water and repeatedly showered through a changing body of air under pressure. This causes the surface of the particles to oxidize. The showers of lead particles which have their surfaces to a great or less extent oxidized, plunge into a body of water and the effect of this is to detach the oxid and expose fresh surfaces of the particles which are in their turn oxidized during the repetition of the described steps. The showering of the water wet particles and their plunging into the body of water may be repeated until the required degree of oxidation is attained. The lead oxid is recovered from the water. Instead of starting with particles of metallic lead, the same may have been oxidized to a greater or less extent.

In the drawings the chamber or vessel *a*, contains a changing body of air under pressure which is supplied by way of the pipe connections *b* and *c* and may be heated. This chamber contains a body of water indicated by the level *d*, *d*¹. *e*, is an elevator, conveyer or the like which causes the comminuted lead to repeatedly fall as a shower through the body of air and to be plunged into the body of water.

I do not intend to limit my invention further than the state of the art may require by any language employed in this specification or apparatus chosen for illustration, but

Having thus described the nature and objects of my invention, what I claim as new and desire to secure by Letters Patent is:

1. The process of preparing lead oxid which consists in causing a body of comminuted water wet lead to repeatedly pass as a shower through a changing body of air under pressure to induce oxidation, repeatedly plunging the showers of lead particles into a body of water thereby detaching the oxid and exposing fresh surfaces of the lead particles for further oxidation, and repeating the foregoing steps until substantially all the lead is oxidized, substantially as described.

2. The process of preparing lead oxid which consists in causing a body of comminuted water wet lead to repeatedly pass as a shower through a changing body of hot air under pressure to induce oxidation, repeatedly plunging the showers of lead particles into a body of water thereby detaching the oxid and exposing fresh surfaces of the lead particles for further oxidation, and repeating the foregoing steps until substantially all the lead is oxidized, substantially as described.

3. The process of preparing lead oxid which consists in causing a body of water wet blown lead to repeatedly pass as a shower through a changing body of air under pressure to induce oxidation, repeatedly plunging the showers of lead particles into a body of water thereby detaching the oxid and exposing fresh surfaces of the lead particles for further oxidation, and repeating the foregoing steps until substantially all the lead is oxidized, substantially as described.

4. The process of preparing lead oxid which consists in causing a comminuted water wet body containing lead to pass as a shower through a changing body of air under pressure to induce oxidation, plunging the showers of particles into a body of water, and repeating the foregoing steps until the desired degree of oxidation is attained, substantially as described.

In testimony whereof I have hereunto signed my name.

CLARENCE A. HALL.

Witnesses:
    W. J. JACKSON,
    R. M. GILLIGAN.